US011682968B2

United States Patent
Yu et al.

(10) Patent No.: US 11,682,968 B2
(45) Date of Patent: Jun. 20, 2023

(54) CONTROL OF POWER CONVERTERS HAVING INTEGRATED CAPACITOR BLOCKED TRANSISTOR CELLS

(71) Applicant: Virginia Tech Intellectual Properties, Inc., Blacksburg, VA (US)

(72) Inventors: Jianghui Yu, Blacksburg, VA (US); Rolando Burgos, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 94 days.

(21) Appl. No.: 16/844,514

(22) Filed: Apr. 9, 2020

(65) Prior Publication Data

US 2021/0320587 A1 Oct. 14, 2021

(51) Int. Cl.
*H02M 3/158* (2006.01)
*H02M 1/38* (2007.01)
*H02M 7/483* (2007.01)

(52) U.S. Cl.
CPC .............. *H02M 3/158* (2013.01); *H02M 1/38* (2013.01); *H02M 7/4833* (2021.05); *H02M 7/4835* (2021.05)

(58) Field of Classification Search
CPC .. H02M 3/158; H02M 3/1588; H02M 1/0095; H02M 1/0083; H02M 7/4833; H02M 7/4835; H02M 7/4837
See application file for complete search history.

(56) References Cited

U.S. PATENT DOCUMENTS

| | | | |
|---|---|---|---|
| 9,525,348 B1 | 12/2016 | Aeloiza et al. | |
| 9,837,921 B2 * | 12/2017 | Deboy | H02M 3/33592 |
| 11,070,124 B2 * | 7/2021 | Ishida | H02M 7/797 |
| 11,437,927 B2 * | 9/2022 | Chen | H02M 1/14 |
| 2008/0310205 A1 * | 12/2008 | Hiller | H02M 7/483 363/131 |
| 2011/0222323 A1 * | 9/2011 | Dofnas | H02M 7/483 363/71 |
| 2012/0147636 A1 * | 6/2012 | Hiller | H02M 7/483 363/55 |

(Continued)

OTHER PUBLICATIONS

Rodriguez, José, et al. "Multilevel voltage-source-converter topologies for industrial medium-voltage drives." IEEE Transactions on industrial electronics 54.6 (2007): 2930-2945.

(Continued)

*Primary Examiner* — Gustavo A Rosario-Benitez
(74) *Attorney, Agent, or Firm* — Thomas | Horstemeyer, LLP

(57) ABSTRACT

Various examples of power converters including Integrated Capacitor Blocked Transistor (ICBT) cells and methods of control of power converters having ICBT cells are described. In one example, a power converter includes an upper arm including a plurality of upper ICBT cells connected in series to form a series connection path and a lower arm including a plurality of lower ICBT cells connected in series in the series connection path. A controller can be configured to provide a control signal pair to each of the upper ICBT cells and a complementary control signal pair to each of the lower ICBT cells to control the converter output. A capacitor voltage controller can be configured to balance a voltage potential among ICBT capacitors in at least one of the upper arm and the lower arm.

15 Claims, 6 Drawing Sheets

(56) References Cited

U.S. PATENT DOCUMENTS

| | | | | |
|---|---|---|---|---|
| 2013/0208519 | A1* | 8/2013 | Yamamoto | H02M 7/4835 363/67 |
| 2014/0002048 | A1* | 1/2014 | Pang | H02M 7/4833 323/304 |
| 2014/0016379 | A1* | 1/2014 | Yamamoto | H02M 7/4835 363/37 |
| 2015/0028826 | A1* | 1/2015 | Davidson | H02M 1/08 323/237 |
| 2015/0124506 | A1* | 5/2015 | Sahoo | H02M 7/4833 363/126 |
| 2015/0207434 | A1* | 7/2015 | Wang | H02M 7/483 363/78 |
| 2016/0072375 | A1* | 3/2016 | Zhou | H02M 7/4833 363/21.1 |
| 2016/0072396 | A1* | 3/2016 | Deboy | H02M 1/42 363/21.1 |
| 2016/0190846 | A1* | 6/2016 | Eckel | H02M 7/483 320/118 |
| 2017/0054294 | A1* | 2/2017 | Lyu | H02J 3/01 |
| 2019/0013742 | A1* | 1/2019 | Briff | H02M 7/483 |
| 2019/0294187 | A1* | 9/2019 | Ying | H02M 1/0095 |
| 2020/0176983 | A1* | 6/2020 | Yasoshima | H02M 3/158 |
| 2020/0201953 | A1* | 6/2020 | Shi | G06F 30/367 |
| 2020/0259411 | A1* | 8/2020 | Ido | H02M 1/32 |
| 2020/0373851 | A1* | 11/2020 | Wang | H02M 1/15 |
| 2021/0389376 | A1* | 12/2021 | Ma | H02M 1/0009 |
| 2022/0014114 | A1* | 1/2022 | Kajiyama | H02M 7/4833 |

OTHER PUBLICATIONS

Sanchez-Ruiz, Alain, et al. "Medium voltage-high power converter topologies comparison procedure, for a 6.6 kV drive application using 4.5 kV IGBT modules." IEEE Transactions on Industrial Electronics 59.3 (2011): 1462-1476.

Chen, Wu, et al. "Analysis and comparison of medium voltage high power DC/DC converters for offshore wind energy systems." IEEE Transactions on Power Electronics 28.4 (2012): 2014-2023.

Dieckerhoff, Sibylle; et al. "Power loss-oriented evaluation of high voltage IGBTs and multilevel converters in transformerless traction applications." IEEE Transactions on power electronics 20.6 (2005): 1328-1336.

Bernet, Steffen. "Recent developments of high power converters for industry and traction applications." IEEE Transactions on Power Electronics 15.6 (2000): 1102-1117.

Friedrich, Kurt: "Modern HVDC PLUS application of VSC in modular multilevel converter topology." 2010 IEEE International Symposium on Industrial Electronics. IEEE, 2010.

Flourentzou, Nikolas; et al. "VSC-based HVDC power transmission systems: An overview." IEEE Transactions on power electronics 24.3 (2009): 592-602.

Shammas, N. Y. A., R; et al. "Review of series and parallel connection of IGBTs." IEE Proceedings—Circuits, Devices and Systems 153.1 (2006): 34-39.

Palmer, Patrick R; et al. "The series connection of IGBTs with active voltage sharing." IEEE Transactions on Power Electronics 12.4 (1997): 637-644.

Vechalapu, Kasunaidu; et al. "Performance evaluation of series connected 1700V SiC MOSFET devices." 2015 IEEE 3rd Workshop on Wide Bandgap Power Devices and Applications (WiPDA). IEEE, 2015. pp. 184-191.

Lai, Jih-Sheng; et al. "Multilevel converters—a new breed of power converters." IEEE Transactions on industry applications 32.3 (1996): 509-517.

Lesnicar, Anton; et al. "An innovative modular multilevel converter topology suitable for a wide power range." 2003 IEEE Bologna Power Tech Conference Proceedings,. vol. 3. IEEE, 2003 pp. 1-6.

Hagiwara, Makoto; et al. "Control and experiment of pulsewidth-modulated modular multilevel converters." IEEE transactions on power electronics 24.7 (2009): 1737-1746.

Yang, Lei, et al. "A module based self-balanced series connection for IGBT." 2014 IEEE Energy Conversion Congress and Exposition (ECCE). IEEE, 2014 pp. 1953-1958.

Yue, Lu; et al. "Implementation of a self-balancing control for series IGBTs." 2018 IEEE Energy Conversion Congress and Exposition (ECCE). IEEE, 2018 pp. 3700-3704.

Yue, Lu; et al. "Investigation of control and applications of modular multilevel converter with sub-modular series igbts." 2018 IEEE Applied Power Electronics Conference and Exposition (APEC). IEEE, 2018. pp. 1486-1491.

Yue, Lu; et al.. "Sub-Modular Circuit Design for Self-Balancing Series-Connected IGBTs in a Modular Multilevel Converter." 2019 IEEE Applied Power Electronics Conference and Exposition (APEC). IEEE, 2019. 3448 3452.

Gowaid, I. A., et al. "Quasi two-level operation of modular multilevel converter for use in a high-power DC transformer with DC fault isolation capability." IEEE Transactions on Power Electronics 30.1 (2014): 108-123.

Marzoughi, Alinaghi; et al. "Active gate-driver with dv/dt controller for dynamic voltage balancing in series-connected SiC MOSFETs." IEEE Transactions on Industrial Electronics 66.4 (2018): 2488-2498.

* cited by examiner

CONTROL OF POWER CONVERTERS HAVING INTEGRATED CAPACITOR BLOCKED TRANSISTOR CELLS

GOVERNMENT LICENSE RIGHTS

This invention was made with government support under DE-AR0000892 awarded by the U.S. Department of Energy. The government has certain rights in the invention.

BACKGROUND

As the need for electric power increases rapidly, much more electric power needs to be converted and transmitted. In high power, medium or high voltage systems, the voltage rating of power converters may exceed the maximum possible voltage rating of a single semiconductor switching device. If connecting multiple devices in series to create an equivalent high-voltage device, it suffers from either additional losses of the balancing circuit or the requirement of fast balancing circuit, in order to ensure the voltage balance. If employing multilevel topologies to reduce the voltage requirement of switches, it suffers from the large size and heavy weight of large capacitors, which are required to keep voltage ripple small.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
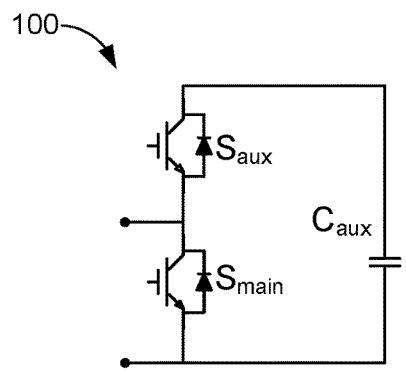
FIG. 1A illustrates an example of an integrated capacitor blocked transistor (ICBT) cell in accordance with various embodiments of the present disclosure.

As noted above, power converters can be relied upon to convert electric energy from one form to another, such as between alternating and direct current, changing the voltage or frequency of power, or changing other characteristics or parameters of electric power. As the need for electric power increases, power converters have been relied upon more extensively to convert and transmit power in different forms. Many power converters include a number of semiconductor switching devices to facilitate the conversion of power from one form to another.

In high power, medium voltage or high voltage systems, the voltage rating of converters may exceed the maximum possible voltage rating of a single semiconductor switching device, such as an insulated gate bipolar transistor (IGBT) or a metal-oxide-semiconductor field-effect transistors (MOSFETs). Generally, there are two methods to resolve this issue. The first method is connecting multiple power devices in series to create an equivalent high-voltage device. The power devices can be thyristors, MOSFETs, bipolar transistors, IGBTs, or similar devices. The main challenge is to ensure the voltage balance among the power devices during both the short turn off transient and the off state. However, this method can suffer from either high losses of the balancing circuits or the requirement of complex and accurate control circuits.

The other method is using multilevel converter topologies to reduce the voltage rating requirement of switches. For example, a modular multilevel converter (MMC) comprises power modules or power cells. The voltage rating of the modules can be a fraction of the total converter rating. Capacitors are commonly used in multilevel converters as internal energy storage and the voltage ripples of capacitors are usually dependent on the converter total power and the line frequency. Therefore, large capacitors are required in high power, 60 Hz systems to keep the capacitor voltage ripple small so that the converters have high output voltage quality.

Integrated Capacitor Blocked Transistor (ICBT) cells provide an alternative solution. Each ICBT cell operates as a single switching device. Series-connected ICBT cells operate as series-connected devices but generate little additional losses and do not require fast balancing control. Converters having ICBT cells have the modular structure and scalability of MMCs, but do not require cell capacitors to have high capacitances. As one example, the aspects of converter control described herein can be applied to the ICBT cells and power converters described in U.S. Pat. No. 9,525,348 ("the '348 patent"), titled "Power Converter Having Integrated Capacitor-Blocked Transistor Cells," the entire contents of which are hereby incorporated herein by reference.

In the context of power converters, various examples related to the control of power converters having ICBT cells are described herein. For example, control methods to ensure effective and safe operation of power converters having ICBT cells, which can be potentially used in medium or high voltage applications, such as ship-to-shore converters, medium voltage, high speed motor drive and grid-connected converters, are described. In one example, a power converter includes an upper arm including a plurality of upper ICBT cells connected in series to form a series connection path and a lower arm including a plurality of lower ICBT cells connected in series in the series connection path. A controller can be configured to provide a control signal pair to each of the upper ICBT cells and a complementary control signal pair to each of the lower ICBT cells to control the converter output. A capacitor voltage controller can be configured to balance a voltage potential among ICBT capacitors in at least one of the upper arm and the lower arm.

Turning to the drawings, FIG. 1A illustrates an example of an ICBT cell 100 in accordance with various embodiments of the present disclosure. The ICBT cell 100 includes a main transistor ($S_{main}$). The ICBT cell 100 also includes a series-connected auxiliary transistor ($S_{aux}$) and auxiliary capacitor ($C_{aux}$). The series-connected auxiliary transistor ($S_{aux}$) and auxiliary capacitor ($C_{aux}$) are coupled in parallel with the main transistor in the ICBT cell 100. In this example, the main transistor and the auxiliary transistor can both be embodied as IGBT switching devices, although other suitable types of switching devices, such as MOSFETs, can be relied upon. Each ICBT cell 100 operates as a single switching device. The ICBT cell 100 forms an equivalent current-bidirectional, voltage-unidirectional switching device.

Figure 1B:
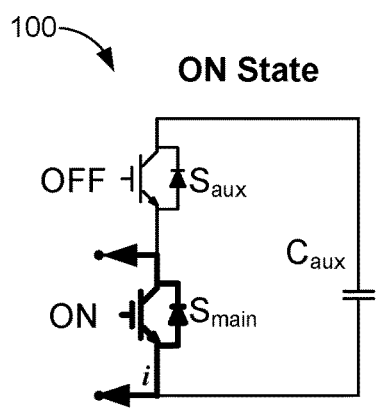
FIG. 1B illustrates the 'on state' of the ICBT cell shown in FIG. 1A in accordance with various embodiments of the present disclosure.

FIG. 1B illustrates the 'on state' the ICBT cell 100 shown in FIG. 1A with a current path through the main transistor ($S_{main}$). The auxiliary capacitor ($C_{aux}$) is disconnected from the circuit. The ICBT cell 100 conducts current with zero voltage in the 'on state'.

Figure 1C:
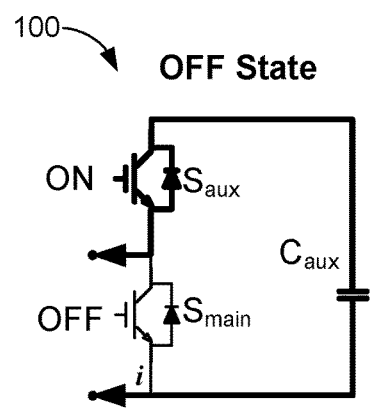
FIG. 1C illustrates the 'off state' the ICBT cell shown in FIG. 1A in accordance with various embodiments of the present disclosure.

FIG. 1C illustrates the 'off state' of the ICBT cell 100 with a current path through the auxiliary transistor ($S_{aux}$) and auxiliary capacitor ($C_{aux}$). The ICBT cell 100 blocks voltage when in the 'off state'. Thus, the voltage blocking functionality in the ICBT cell 100 is provided by the auxiliary capacitor, not a transistor. As such, the transistors in the ICBT cell 100 only need to block the voltage across the auxiliary capacitor, not the circuit voltage across the terminals.

While FIGS. 1A-1C show a basic configuration of an ICBT cell including a pair of IGBT switching devices, alternate switching devices and configurations can be used. Because the ICBT cell 100 is representative, it should be appreciated that certain elements can be omitted from those shown in FIG. 1A and other elements can be added (or are relied upon in practice but are simply omitted from view in FIG. 1A). For example, the ICBT cell 100 can include a parallel connected bypass switch or other devices with a short-circuit failure mode. Any suitable configuration for the ICBT 100 can be used in the embodiments described herein, including those described in the '348 patent, for example. The ICBT cell 100 can be constructed using devices such as thyristors, MOSFETs, bipolar transistors, and the like.

A control method is described in additional detail below. The control method was developed for power converters having ICBT cells to fully utilize the advantages and ensure the safe operation of such converters. Examples of power converters including ICBT cells are described below, but it should be appreciated that ICBT cells can relied upon in any topology of power converter, including unidirectional and bidirectional DC-AC, AC-DC, AC-AC, and DC-DC converters of any topology or arrangement of switching devices (e.g., buck, boost, buck-boost, half bridge, full bridge, etc.)

Figure 2:
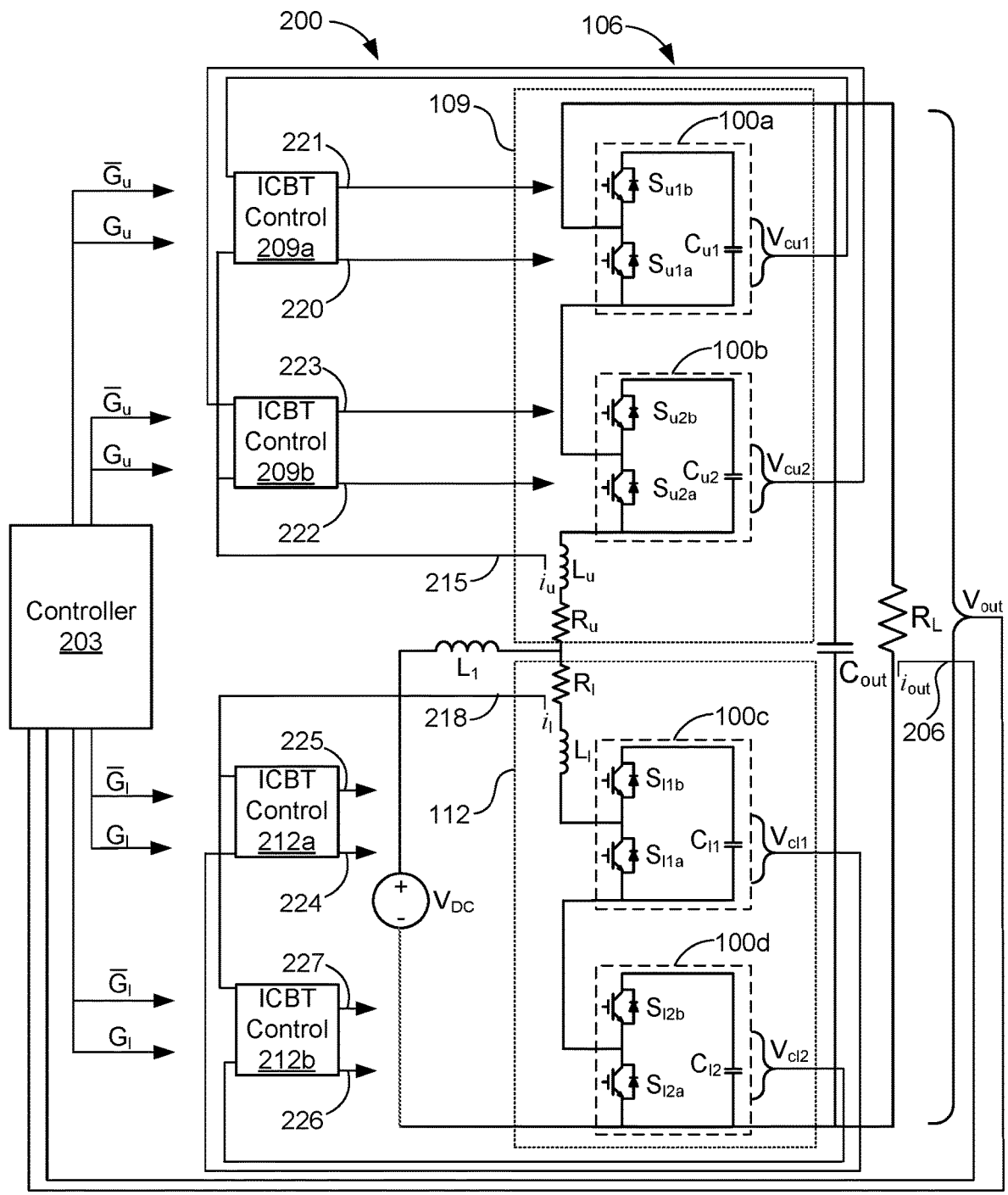
FIG. 2 illustrates an example converter configured with ICBT cells in accordance with various embodiments of the present disclosure.

FIG. 2 illustrates an example boost converter 200 ("converter 200") including a plurality of ICBT cells 100a-d. The converter 200 is provided as an example to explain and demonstrate the advantages of the concepts described herein, but the concepts can be applied to other types and topologies of power converters. The converter 200 includes a DC voltage source ($V_{DC}$), an ICBT-based phase leg 106, an inductor ($L_1$), an output capacitor ($C_{out}$), and a load ($R_L$). The phase leg 106 includes two converter arms 109 and 112.

The converter arm 109 includes two ICBT cells 100a-b, and the converter arm 112 includes two ICBT cells 100c-d (separately "ICBT cell 100," collectively "ICBT cells 100"). The converter arms 109 and 112 include small parasitic resistors ($R_u$, $R_l$) and parasitic inductors ($L_u$, $L_l$). Because the converter 200 is representative, it should be appreciated that certain elements can be omitted from those shown in FIG. 2 and other elements can be added (or are simply omitted from view in FIG. 2). For example, the upper and/or lower arm can have additional ICBT cells connected in series, and other variations are within the scope of the embodiments.

As shown in FIG. 2, located first from the top in the upper arm 109 are the $S_{u1a}$ and $S_{u1b}$ switching devices of ICBT cell 100a. Beneath 100a in the upper arm 109 is ICBT cell 100b, which includes the $S_{u2a}$ and $S_{u2b}$ switching devices. Similarly, $S_{l1a}$ and $S_{l1b}$ are the switching devices of the ICBT cell 100c in the lower arm 112, and $S_{l2a}$ and $S_{l2b}$ are the switches of cell the ICBT cell 100d in the lower arm 112. In this example, $S_{u1a}$, $S_{u2a}$, $S_{l1a}$, and $S_{l2a}$ are the main switches in the respective cells and $S_{u1b}$, $S_{u2b}$, $S_{l1b}$, and $S_{l2b}$ are the auxiliary switches in the respective cells. The ICBT cells 100a-d also include auxiliary capacitors $C_{u1}$, $C_{u2}$, $C_{l1}$, and $C_{l2}$ connected in series with auxiliary switches $S_{u1b}$, $S_{u2b}$, $S_{l1b}$, and $S_{l2b}$, respectively.

In one example, the converter 200 has two levels of control for the ICBT cells 100, including the main controller 203 and the local ICBT controllers 209 and 212. As described in further detail below, the main controller 203 and the local ICBT controllers 209 and 212 can be embodied in the form of hardware, firmware, software executable by hardware, or as any combination thereof, including at least one processor or processing circuit and a memory device.

As shown, the converter 200 includes the main controller 203 at the converter level and the local ICBT controllers 209a, 209b, 212a, and 212b for the ICBT cells 100. The main controller 203 can be configured to measure the load voltage ($V_L$) and sense the amount of current over the load ($i_{out}$) at the converter level. At the converter level, the main controller 203 is configured to control the output of the converter 200 by changing the duty cycle ratios of the switch devices in the ICBT cells 100, similar to the type of control relied upon in traditional converters. The duty ratios can be generated in an open-loop configuration without the reliance on feedback, or by closed-loop current or voltage control. In one example, the main controller 203 can be configured to measure the output voltage ($V_{out}$) of the converter 200 and sense the amount of current supplied to the load ($R_L$) using a current sensor 206. The main controller 203 can also be configured to adjust the duty cycle ratios of the ICBT cells 100 based on the desired or needed amount of current supplied to the load ($R_L$), as measured using the current sensor 206.

Figure 3:
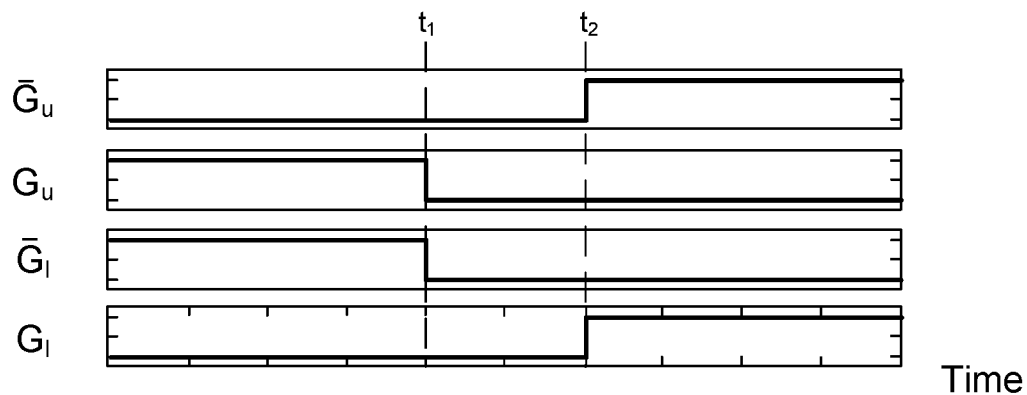
FIG. 3 illustrates an example of gate signals generated by the controller for the upper and lower arm in accordance with various embodiments of the present disclosure.
Figure 4:
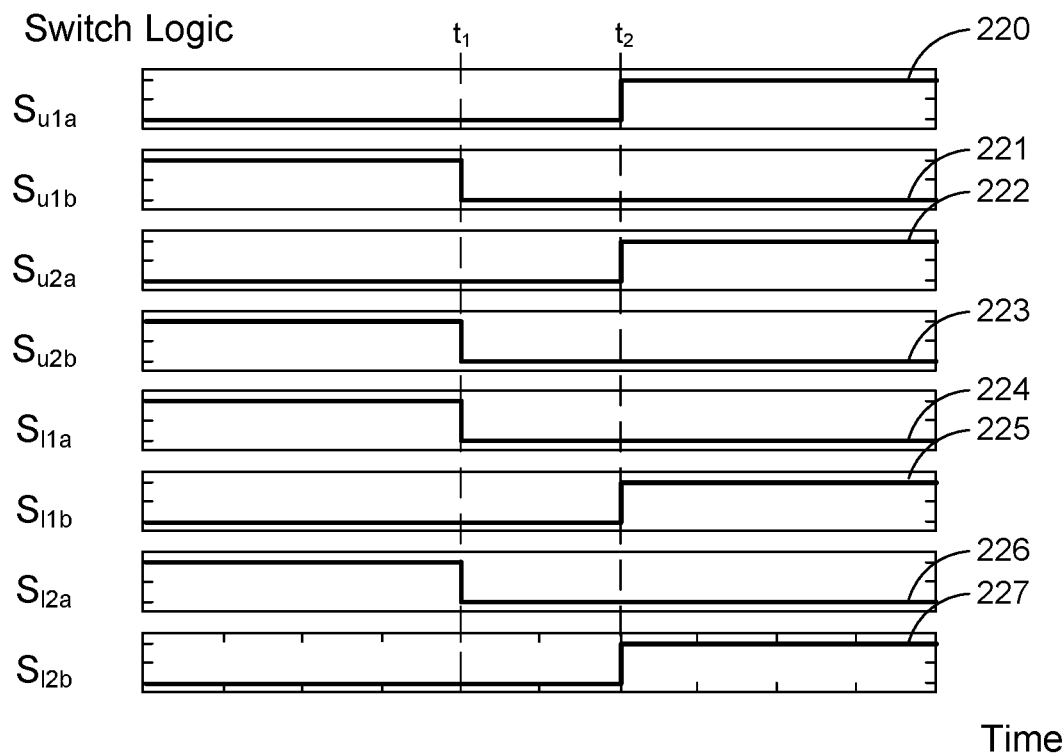
FIG. 4 illustrates example gate signals for the ICBT cells in the converter shown in FIG. 2 in accordance with various embodiments of the present disclosure.

The main controller 203 and local controllers 209, 212 switch the ICBT cells 100 by sending a control signal pair of gate signals to the main and auxiliary switches of each ICBT cell 100. As can be understood in the context of FIG. 2, the main controller generates control signal pairs. The ICBT cells 100a and 100b in the upper arm 109 receive the same control signals ($G_u$, $\overline{G}_u$) from the main controller 203, ICBT cells 100c and 100d in the lower arm 112 receive the same control signals ($G_l$, $\overline{G}_l$) from the main controller 203 via the local controllers 209a, 209b, 212a, and 212b, respectively. If the local controllers pass through the original signal for an ideal case, all the ICBT cells in the same arm switch at the same time. Referring to FIGS. 2-4, the signal $G_u$ would correspond to gate signals 220 and 222 received by the main switches in the upper arm and $\overline{G}_u$ would correspond to gate signals 221 and 223 received by the auxiliary switches in the upper arm. Similarly, the signal $G_l$ would correspond to gate signals 224 and 226 received by the main switches in the lower arm and $\overline{G}_l$ would correspond to gate signals 225 and 227 received by the auxiliary switches in the lower arm. Further, as can be understood in the context of FIG. 3, the gate signals to the upper arm 109 are complementary to the lower arm 112. There is also a dead time between turning off the main transistors in one arm and turning on the main transistors in the opposite arm.

Each control signal pair includes two control signals that operate in a complementary way. For example, when the gate signal 220 provided to the main switch $S_{u1a}$ of the ICBT cell 100a is 'on,' then the complementary gate signal 221 provided to the auxiliary switch $S_{u1b}$ is 'off.' Similarly, when the gate signal provided to the auxiliary switch $S_{u1b}$ of the ICBT cell 100a is cony, then the gate signal provided to the main switch $S_{u1a}$ is 'off'. Additionally, there is a dead time between turning off a main transistor of each ICBT cell 100 and turning on the auxiliary transistor within the same ICBT cell 100. It should be noted that this is just one way of implementation. In one example, the main controller 203 may just send $G_u$ and $G_l$ to local controllers and local controllers generate the complementary signals. In another example, the main controller 203 may just send duty ratio values to the converter arms instead of gate signals.

FIG. 4 illustrates example gate signals 220-227 for the ICBT cells 100 in the converter 200 shown in FIG. 2 when the local controllers just send out the control signals received from the main controller 203 without any modification in accordance with various embodiments of the present disclosure. The gate signals 220 and 221 form a control signal pair of gate signals for the ICBT 100a. The gate signals 222 and 223 form a control signal pair of gate signals for the ICBT 100b. The gate signals 224 and 225 form a control signal pair of gate signals for the ICBT 100c. The gate signals 226 and 227 form a control signal pair of gate signals for the ICBT 100d.

As shown in FIG. 2, the main switches $S_{u1a}$ and $S_{u2a}$ of the upper arm 109 receive the gate signals 220 and 222, respectively, which have the same logic transitions ($G_u$). Likewise, the main switches $S_{l1a}$ and $S_{l2a}$ of the lower arm 112 receive the gate signals 224 and 226, respectively, which have the same logic transitions ($G_l$), complementary to ($G_u$). As shown, the gate signals for the main switches in opposite arms are complementary as compared to each other. For example, the gate signals 220 and 222 for $S_{u1a}$ and $S_{u2a}$ in the upper arm 109 are complementary to signals 224 and 226 for $S_{l1a}$ and $S_{l2a}$ in the lower arm 112, with the dead time between $t_1$ and $t_2$ indicated with the dashed lines. For any control signal pair, the dead time of the control signal pair is the time between when a control signal for either the main switch or the auxiliary switch transitions from "on" to "off" until when the other switch transitions from "off" to "on," as identified as the time between $t_1$ and $t_2$ in FIG. 4.

Additionally, as shown in FIG. 2, the control signal pair provided to each ICBT cell 100 includes complementary gate signals for the main switch and the auxiliary switch. As such, the gate signals for the main switch and auxiliary switch in the same cell are complementary with dead time. For example, as shown in FIG. 4, the curves 220 and 222 for gate signals of the main switches $S_{u1a}$ and $S_{u2a}$ in the upper arm 109 are complementary to curves 221 and 223 of auxiliary switches $S_{u1b}$ and $S_{u2b}$, shown with dead time. In this example, the gate signal is cony from t=0 to t=$t_1$ and 'off' after t=$t_2$, with the dead time shown between t=$t_1$ and t=$t_2$. Similarly, in lower arm 112, curves 224 and 226 of main switches $S_{l1a}$ and $S_{l2a}$ are complementary to curves 225 and 227 of auxiliary switches $S_{l1b}$ and $S_{l2b}$, shown with dead time.

In this example, the dead time within a phase leg, which is between 220 and 224, and the dead time within a power cell, which is between 220 and 221, have the same duration length. However, they may have different duration lengths to improve performances during the switching transition.

Figure 5:
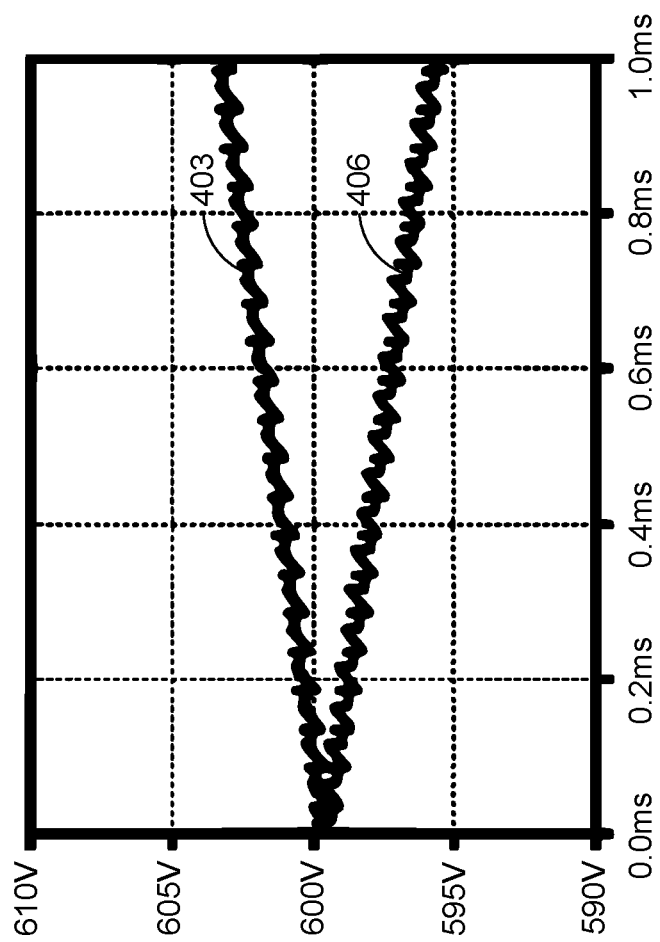
FIG. 5 illustrates example simulation results of two lower arm cell capacitor voltages in the converter shown in FIG. 2 in accordance with various embodiments of the present disclosure.

In one example evaluation, it can be assumed that all control and driving circuits are identical and that all the switching devices are identical. However, small parasitic capacitors exist from device gate terminals to ground and from device drain terminals to ground in the switching devices. With this condition as an example, the two ICBT cells 100c and 100d in the lower arm 112 turn on at the same time and turn off at the same time, but the switching speeds are different as a result of the parasitic capacitors. Although the two capacitor voltages $V_{c l 1}$ and $V_{c l 2}$ have the same initial values and the sum of the voltage value does not change, a voltage difference ($V_{c l 2}-V_{c l 1}$) starts to appear and keeps increasing. As shown in FIG. 5, the curve 403 represents the capacitor voltage $V_{c l 2}$ in this condition increasing over time, and curve 406 represents capacitor voltages $V_{c l 1}$ in this condition decreasing over time. This demonstrates that capacitor voltage control is essential, which is implemented in the local controllers, to power converters having ICBT cells, such as the power converter 200.

At the converter arm level, the cell capacitor voltages can be controlled with local controllers. For example, as shown in FIG. 2, the ICBT cells 100 can be controlled in each arm using the ICBT controllers 209 and 212. During the operation of the converter 200, the voltage each switching device needs to block in each ICBT cell 100 is equal to the capacitor voltage in the corresponding cell. For the example in FIG. 2, the lower arm 112 capacitor voltages for 110c and 100d are $V_{c l 1}$ and $V_{c l 2}$. It can be important to control the capacitor voltages so that all the switching devices in the ICBT cells 100 operate within a rated, safe operation range. Unlike capacitors in MMCs, the cell capacitors play little role in power transfer in converters having ICBT cells. In converters having ICBT cells, the capacitors do not need to store and release large energy during switching operations, and therefore have smaller voltage ripples. As a result, the cell capacitors do not need have high capacitance values.

When all the ICBT cells 100 in one arm are off, the sum of the cell capacitor voltages equals to the DC bus voltage minus the voltage drop on the parasitic impedances in the corresponding phase leg. In other words, the average capacitor voltage depends on the converter operation condition and does not require specific control. On the other hand, the voltage balance of the cell capacitors can be ensured by closed-loop control.

The cell capacitors in one arm share the same current when all the corresponding cells are 'on,' and when all the corresponding cells are 'off'. However, it cannot be guaranteed that the turn-on events and turn-off events of the cells happen at the same time and last for the same duration. There are several main contributors of the difference. First, control and driving circuits have slightly different propagation delays, causing differences in the switching timing. Second, switching devices have slightly different characteristic values such as the threshold voltage value and the output capacitance value, resulting in different switching speeds. Third, the parasitic capacitors from device terminals to ground may affect the device terminal currents, as a result of the high dv/dt across the parasitic capacitors during the switching transients. All these mismatches and parasitics lead to different capacitor currents during transients, different amounts of charge flowing into and out of the capacitors, and eventually different capacitor voltages. If directly connecting switching devices in series, the voltage differences among the devices reset at every turn-on event. But in converters having ICBT cells, voltage differences can keep accumulating in the capacitors of the ICBT cells and should be controlled.

According to the concepts described herein, the capacitor voltages are controlled by adding appropriate delays (to) to the gate signals generated by the converter level main controller 203. This capacitor voltage control is distributed into each ICBT cell. As shown in FIG. 2, the local controllers 209 and 212 for the upper and lower arms 109 and 212, respectively, can be configured to measure the capacitor voltages ($V_c$) of the ICBT cells 100, individually. The local controllers 209 and 212 can also be configured to sense the amount of current in the upper and lower arms using current sensors 215 and 218, respectively. The local controllers 209 and 212 can provide analog and/or digital feedback data representative of the cell capacitor voltages ($V_c$) and the currents in the upper and lower arms to the main controller 203.

Local controllers can also be configured to determine, for each ICBT cell 100, whether and when to add a delay in a control signal pair, based on the cell capacitor voltages ($V_c$) and currents in the upper and lower arms, for any level of voltage unbalance. Although the local controllers 209 and 212 are shown schematically as separate controllers in FIG. 2, the local controllers 209 and 212 can also be configured with the individual ICBT cells 100 or embodied as part of the main controller 203.

Figure 6:
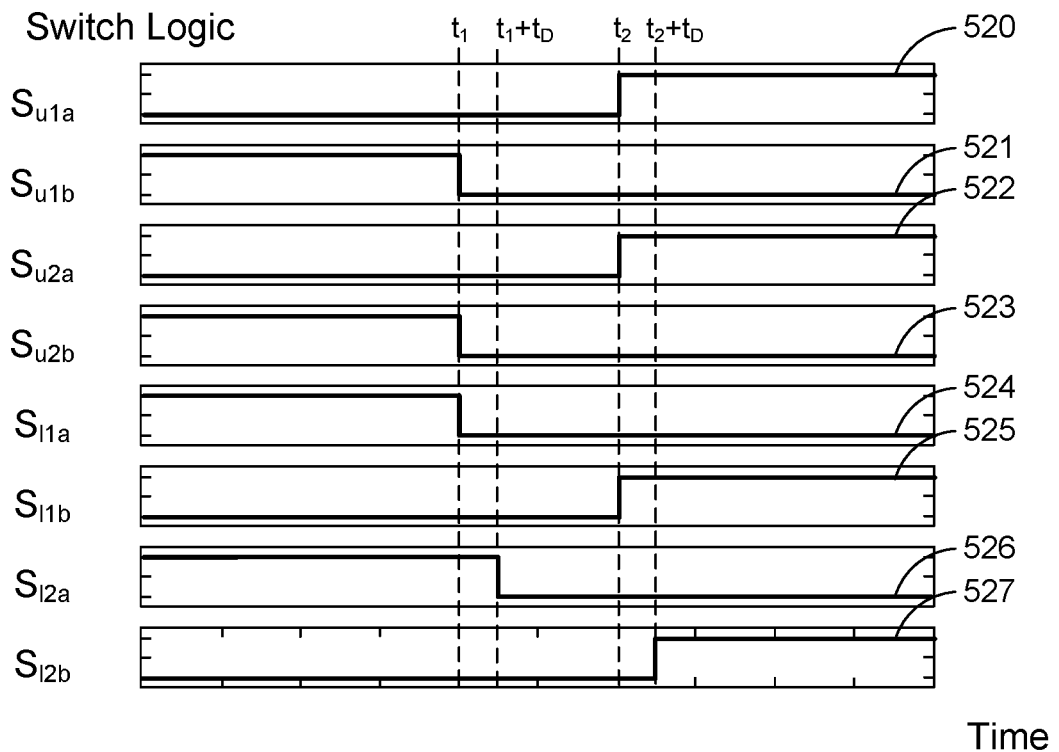
FIG. 6 illustrates example gate signals for the ICBT cells in the converter shown in FIG. 2, with delays, in accordance with various embodiments of the present disclosure.

As an example of implementing local control, it can be determined whether over-voltage exists in each ICBT cell. The gate signals are sent to the upper and lower arms from the main controller 203 as shown in FIG. 3. FIG. 6 illustrates example gate signals 520-527 for the ICBT cells in the converter shown in FIG. 2, with delays, in accordance with various embodiments of the present disclosure. In this example, the direction of current in lower arm 112 is from the phase leg output terminal to the negative DC bus, and the voltage $V_{cl2}$ of the second lower arm cell capacitor $C_{l2}$ is higher than the rated value. To control the lower arm capacitor voltages in this condition, the main controller 203 is configured to add a delay to control signal pair for the two switches $S_{l2a}$ and $S_{l2b}$ in the ICBT cell 100d in the lower arm 112.

As shown in FIG. 6, gate signals 520-527 for the ICBT cells 100 in the converter 200 shown in FIG. 2 in accordance with various embodiments of the present disclosure. Similar to 220 and 221 shown in FIG. 2, the gate signals 520 and 521 form a control signal pair for the ICBT 100a. The gate signals 522 and 523 form a control signal pair for the ICBT 100b. The gate signals 524 and 525 form a control signal pair for the ICBT 100c. The gate signals 526 and 527 form a control signal pair for the ICBT 100d. In this example, the signals 520-525 have no delay applied and correspond to the signals 220-225 in FIG. 4. The gate signals 526 and 527 are offset by a time delay to.

During the period shown in the FIG. 6, the main switches $S_{u1a}$ and $S_{u2a}$ of the two upper arm cells 100a and 100b turn on synchronously at time $t_2$, the main switch $S_{l1a}$ of first ICBT cell 100c in the lower arm 112 turns off at the same time $t_2$, but the main switch $S_{l2a}$ of the second ICBT cell 100d in the lower arm 112 is controlled to have delayed turn-off. As such, the main switch $S_{l2a}$ of the second ICBT cell 100d in the lower arm 112 remains on until $t=t_1+t_D$, then has the same dead time as the other switches with auxiliary switch $S_{l2b}$ of the second ICBT cell 100d in the lower arm 112 turning on at $t=t_2+t_D$. By applying the delays, the two lower arm cell capacitors $C_{l1}$ and $C_{l2}$ are forced to have different current for a short period of time, reducing the capacitor voltage difference.

Figure 7:
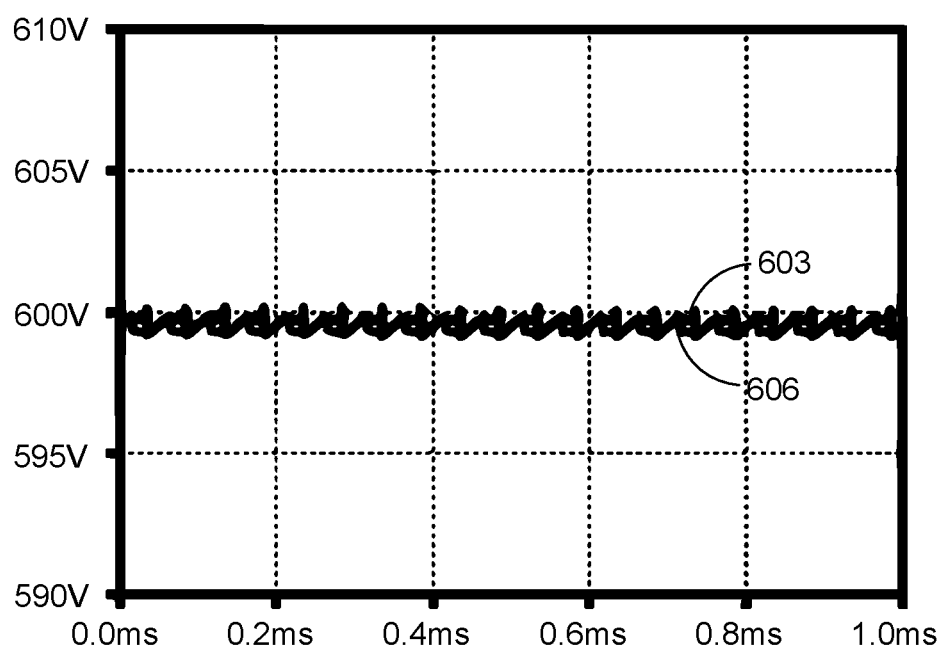
FIG. 7 illustrates example simulation results of two lower arm cell capacitor voltages with the developed control method for the converter shown in FIG. 2 in accordance with various embodiments of the present disclosure.

FIG. 7 shows the simulation results of two lower arm cell capacitor voltages $V_{cl1}$ and $V_{cl2}$ with the developed control method. For example, in FIG. 7, the curve 603 represents capacitor voltages $V_{cl2}$ in this condition over time, and curve 606 represents capacitor voltages $V_{cl1}$ in this condition over time. The capacitor voltages have the same average value and small ripple, demonstrating the effectiveness of the method and concepts described herein.

As shown in FIG. 6, delays are applied to the ICBT cell 100 with the higher capacitor voltage at turn off events if the lower arm current is positive. Delays can also be applied to the ICBT cell 100 with the higher capacitor voltage at turn on events if the lower arm current is negative. Accordingly, the same method can be used for the capacitor voltage control in the upper arm. Additionally, when there are more cells in converter arms, the method can be applied in the same manner.

Figure 8:
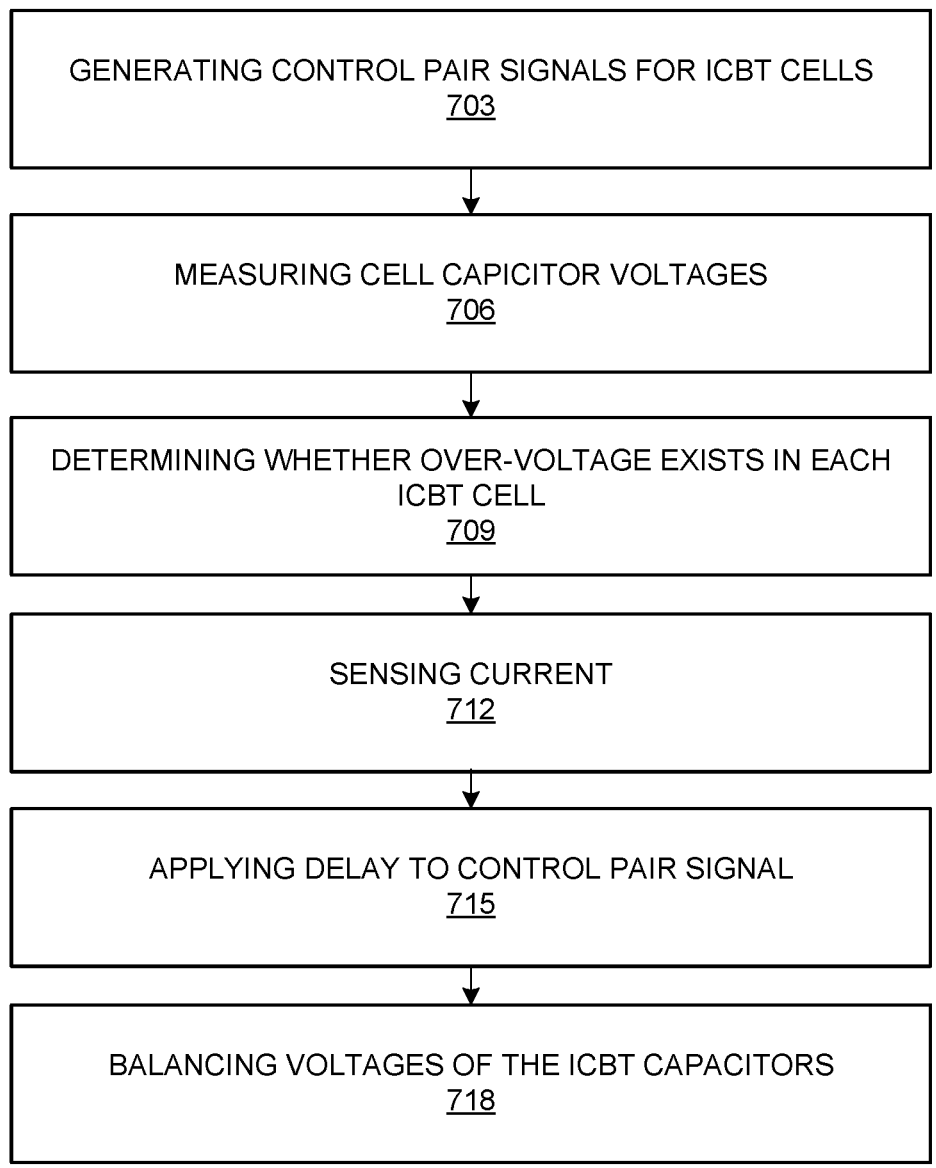
FIG. 8 illustrates a method of control in accordance with various embodiments of the present disclosure.

FIG. 8 illustrates an example method 700 of control in accordance with various embodiments of the present disclosure. The method 700 is described with reference to the example power converter 200 shown in FIG. 2 but can be applied and extended to use with other power converters. While the method 700 can be applied to either the upper arm 109 or the lower arm 112 of the power converter 200, the lower arm 112 is discussed as an example. Additionally, while the steps of the method 700 are presented in a certain order in FIG. 8, one or more of the steps can be rearranged, additional steps may be included, and steps can be omitted from the method 700.

At step 703, the method 700 includes generating one pair of control signal pairs for the ICBT cells 100a and 100b in the upper arm 109, and another pair of control signal pairs for the ICBT cells 100c and 100d in the lower arm 112, in a phase leg of a power converter. As an example, with reference to FIG. 2, the first ICBT cell 100c and second ICBT cell 100d are shown in the lower arm 112 of the phase leg 106. The main controller 203 is configured to generate a control signal pair ($G_l$, $\overline{G}_l$) for the two ICBT cells 100c and 100d. In this example, as shown in FIG. 6, the gate signal $G_l$ directed to the main switches $S_{l1a}$ and $S_{l2a}$ begins in an 'on' state. Similarly, the complementary gate signal Gl directed to the auxiliary switches $S_{l1b}$ and $S_{l2b}$ begins in an 'off' state.

At step 706, the method 700 includes measuring the voltage of a first and second capacitor of the first and second ICBT cells in the arm. As shown in FIG. 2, the capacitor voltage $V_{cl1}$ of the first capacitor $C_{l1}$ of the first ICBT cell 100c and the capacitor voltage $V_{cl2}$ of the second capacitor $C_{l2}$ of the second ICBT cell 100d can be measured by each ICBT controller 212a and 212b.

At step 709, the method 700 includes determining whether over-voltage exists in each cell. Referring to the example shown in FIG. 5, the curve 403 represents the capacitor voltage $V_{cl2}$ increasing over time, and curve 406 represents the capacitor voltage $V_{cl1}$ decreasing over time. Without control, the voltage difference between $V_{cl2}$ and $V_{cl1}$ will continue to grow over time. In this case, the first capacitor $C_{l1}$ has a greater value than the rated value. The local controllers are configured to evaluate the values of $V_{cl2}$ and $V_{cl1}$ respectively, and determine that the first capacitor $C_{l1}$ has a greater capacitor voltage $V_{cl1}$.

At step 712, the method 700 includes sensing a current in the arm. As shown in FIG. 2, a current sensor 218 can be positioned to sense the current in the lower arm 112. The ICBT controller 212 is configured to sense the current in the lower arm 112 using the current sensor 218. The current being positive or negative indicates the condition of the lower arm 112.

At step 715, the method 700 includes applying a delay to the control signal pair for the ICBT cell having a greater capacitor voltage. In response to the current being positive, the delay is applied to the control signal pair received by the ICBT cell of a higher capacitor voltage within arm at a turn-off event. In response to the current being negative, the delay is applied to the control signal pair received by the ICBT cell of a higher capacitor voltage within arm at a turn-on event. According to the example, since it was determined at step 709 that the first capacitor $C_{f1}$ has the greater capacitor voltage $V_{cf1}$, the delay is apply to the control signal pair generated for the ICBT cell 100d. As shown in FIG. 6, the control signal pair for the ICBT cell 100c provides a turn off event for $S_{l1a}$ at $t_1$ and a turn on event for $S_{l1b}$ at $t_2$, with a dead time in between. However, the delay to is applied to the control signal pair for the ICBT cell 100d. As such, a turn off event for $S_{l2a}$ at $t=t_1+t_D$ and a turn on event for $S_{l2b}$ at $t=t_2+t_D$, with a dead time in between.

At step 718, the method 700 includes balancing the voltages of the ICBT capacitors in the arm of the phase leg. As shown in FIG. 7, applying the offset delay over time decreases the capacitor voltage differences in an arm, balancing the voltages.

The control method described herein is not limited to any particular type of power converter, but can be applied to many different types of power converters having ICBT cells, such as unidirectional or bidirectional DC-DC boost converters, DC-DC buck converters, two-level DC-AC inverters, three-level DC-AC inverters, and the like. For any converter topology, at least one switching device can be replaced by a converter arm having ICBT cells.

The components described herein, including the main controller 203 and the local ICBT controllers 209 and 212, can be embodied in the form of hardware, firmware, software executable by hardware, or as any combination thereof. If embodied as hardware, the components described herein can be implemented as a collection of discrete analog, digital, or mixed analog and digital circuit components. The hardware can include one or more discrete logic circuits, microprocessors, microcontrollers, or digital signal processors (DSPs), application specific integrated circuits (ASICs), programmable logic devices (e.g., field-programmable gate array (FPGAs)), or complex programmable logic devices (CPLDs)), among other types of processing circuitry. The microprocessors, microcontrollers, or DSPs, for example, can execute software to perform the control aspects of the embodiments described herein. Any software or program instructions can be embodied in or on any suitable type of non-transitory computer-readable medium for execution.

Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A power converter having integrated capacitor blocked transistor (ICBT) cells, comprising:
an upper arm comprising a first plurality of ICBT cells connected in series;
a lower arm comprising a second plurality of ICBT cells connected in series and
a controller configured to:
provide an upper control signal pair to individual ones of the first plurality of ICBT cells of the upper arm and a lower control signal pair to individual ones of the second plurality of ICBT cells of the lower arm to control an output of the power converter;
determine whether an over-voltage exists as compared to a rated ICBT capacitor voltage for an ICBT cell in at least one of the upper arm or the lower arm, wherein the determination comprises:
measuring voltages of the ICBT capacitors;
determining which ICBT capacitor among the ICBT capacitors in the at least one of the upper arm or the lower arm has a greater capacitor voltage than a rated value; and
sensing a current in the at least one of the upper arm or the lower arm; and
apply a delay to both control signals of the upper control signal pair or the lower control signal pair provided to the ICBT cell having the over-voltage, to balance a voltage potential among ICBT capacitors in at least one of the upper arm and the lower arm, wherein:
in response to the current being positive, the delay is applied to the control signal pair for the ICBT cell having the greater capacitor voltage than a rated value in the arm at a turn-off event, or
in response to the current being negative, the delay is applied to the control signal pair for the ICBT cell having the greater capacitor voltage than a rated value in the arm at a turn-on event.

2. The power converter of claim 1, wherein each ICBT cell in the power converter comprises:
a main transistor;
an auxiliary transistor; and
an ICBT capacitor, wherein the auxiliary transistor is series-connected with the ICBT capacitor, and the series-connected auxiliary transistor and the ICBT capacitor are connected in parallel with the main transistor.

3. The power converter of claim 2, wherein the control signal pair comprises a first gate signal for the main transistor and a second gate signal for the auxiliary transistor.

4. The power converter of claim 3, wherein the first gate signal is complementary to the second gate signal, with a dead time between at least one of:
turning off the main transistor and turning on the auxiliary transistor, and turning on the main transistor and turning off the auxiliary transistor.

5. The power converter of claim 1, wherein at least one control signal pair provided to the upper arm is complementary to at least one control signal pair provided to the lower arm.

6. The power converter of claim 1, wherein the controller is further configured to measure an arm current and the voltage potential of individual ICBT capacitors in at least one of the upper arm and the lower arm.

7. A power converter having integrated capacitor blocked transistor (ICBT) cells, comprising:
a phase leg comprising an arm, the arm of the phase leg comprising a plurality of ICBT cells connected in series; and
a controller configured to:
generate a control signal pair for individual ones of the plurality of ICBT cells in the arm, the control signal pair generated for the individual ones of the plurality of ICBT cells being the same signal pair of control signals;
determine whether an over-voltage exists in at least one ICBT cell as compared to a rated ICBT capacitor voltage for an ICBT cell in the arm, wherein the determination comprises:
measuring voltages of the ICBT capacitors;
determining which ICBT capacitor among the ICBT capacitors in the arm has a greater capacitor voltage than a rated value; and
sensing a current in the arm of the phase leg; and
apply a delay to both control signals of the control signal pair generated for the ICBT cell having the over-voltage to balance a voltage potential among ICBT capacitors of the ICBT cells in the arm, wherein:
in response to the current being positive, the delay is applied to the control signal pair for the ICBT cell having the greater capacitor voltage than a rated value in the arm at a turn-off event, or
in response to the current being negative, the delay is applied to the control signal pair for the ICBT cell having the greater capacitor voltage than a rated value in the arm at a turn-on event.

8. The power converter of claim 7, wherein the controller is further configured to measure a current in the arm and the voltage potential of individual ICBT capacitors in the arm.

9. The power converter of claim 8, wherein the controller is further configured to calculate a delay offset based on the current in the arm and the voltage potential of the individual ICBT capacitors in the arm.

10. The power converter of claim 9, wherein the controller is further configured to apply the delay offset to the control signal pair for the at least one of the plurality of ICBT cells having the over-voltage.

11. The power converter of claim 7, wherein each ICBT cell in the power converter comprises:
a main transistor;
an auxiliary transistor; and
an ICBT capacitor, wherein the auxiliary transistor is series-connected with the ICBT capacitor, and the series-connected auxiliary transistor and the ICBT capacitor are connected in parallel with the main transistor.

12. The power converter of claim 11, wherein the control signal pair comprises a first gate signal for the main transistor and a second gate signal for the auxiliary transistor.

13. The power converter of claim 12, wherein the first gate signal is complementary to the second gate signal, with a dead time between at least one of: turning off the main transistor and turning on the auxiliary transistor, and turning on the main transistor and turning off the auxiliary transistor.

14. A method of control for a power converter having integrated capacitor blocked transistor (ICBT) cells, the method comprising:
generating a first control signal pair for a first ICBT cell in the power converter and a second control signal pair for a second ICBT cell in the power converter, the first ICBT cell and the second ICBT cell being connected in an arm of a phase leg of the power converter, the first control signal pair and the second signal pair being the same signal pair of control signals;
measuring voltages of the ICBT capacitors;
determining which ICBT capacitor among the ICBT capacitors in the arm of the phase leg has a greater capacitor voltage than a rated value;
sensing a current in the arm of the phase leg; and
applying a delay to both control signals for the first control signal pair or the second control signal pair to balance voltages of ICBT capacitors of the ICBT cells in the arm of the phase leg, wherein:
in response to the current being positive, applying the delay to the control signal pair for the first ICBT cell or the second ICBT cell having the greater capacitor voltage than a rated value in the arm at a turn-off event, or
in response to the current being negative, applying the delay to the control signal pair for the first ICBT cell or the second ICBT cell having the greater capacitor voltage than a rated value in the arm at a turn-on event.

15. The method of claim 14, wherein each ICBT cell in the power converter comprises:
a main transistor;
an auxiliary transistor; and
an ICBT capacitor, wherein the auxiliary transistor is series-connected with the ICBT capacitor, and the series-connected auxiliary transistor and the ICBT capacitor are connected in parallel with the main transistor.

* * * * *